Feb. 17, 1953  J. M. ULRICH  2,628,603
INTERNAL-COMBUSTION ENGINE
Filed April 14, 1950  3 Sheets-Sheet 3
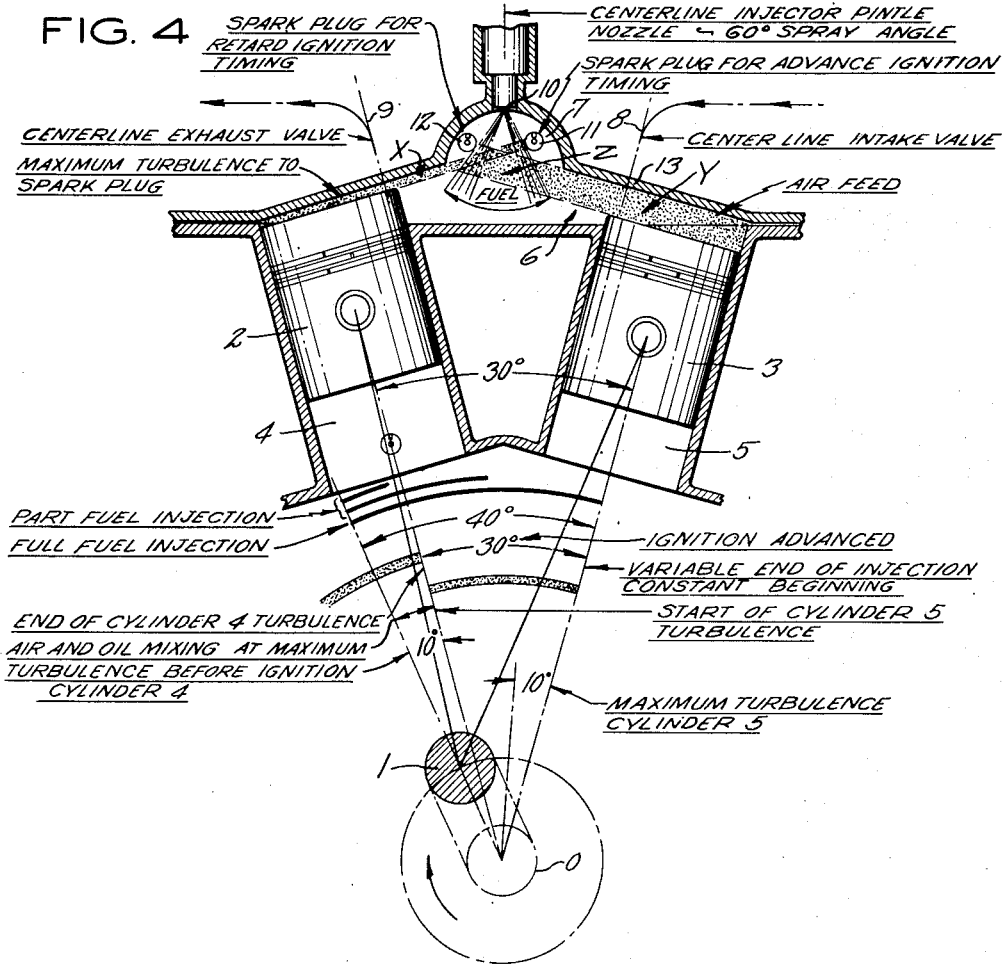
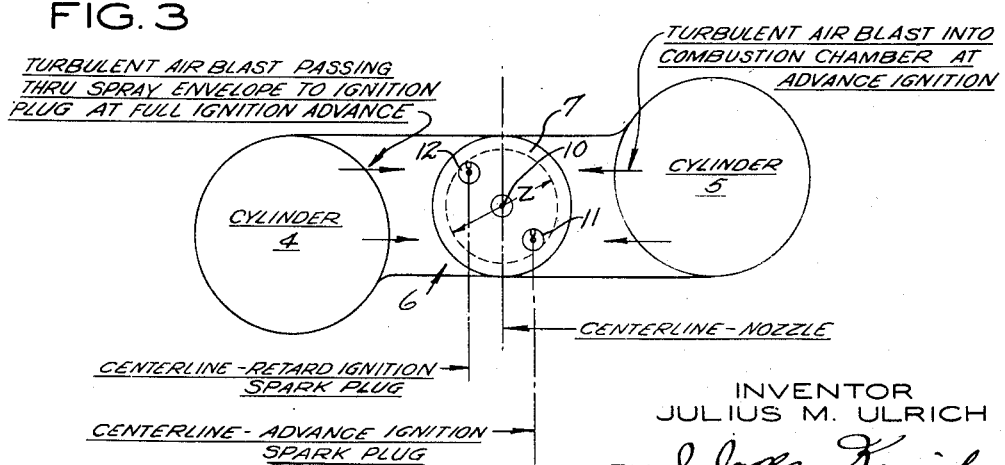
INVENTOR
JULIUS M. ULRICH
BY J. Jordan Kunik
ATTORNEY Patented Feb. 17, 1953

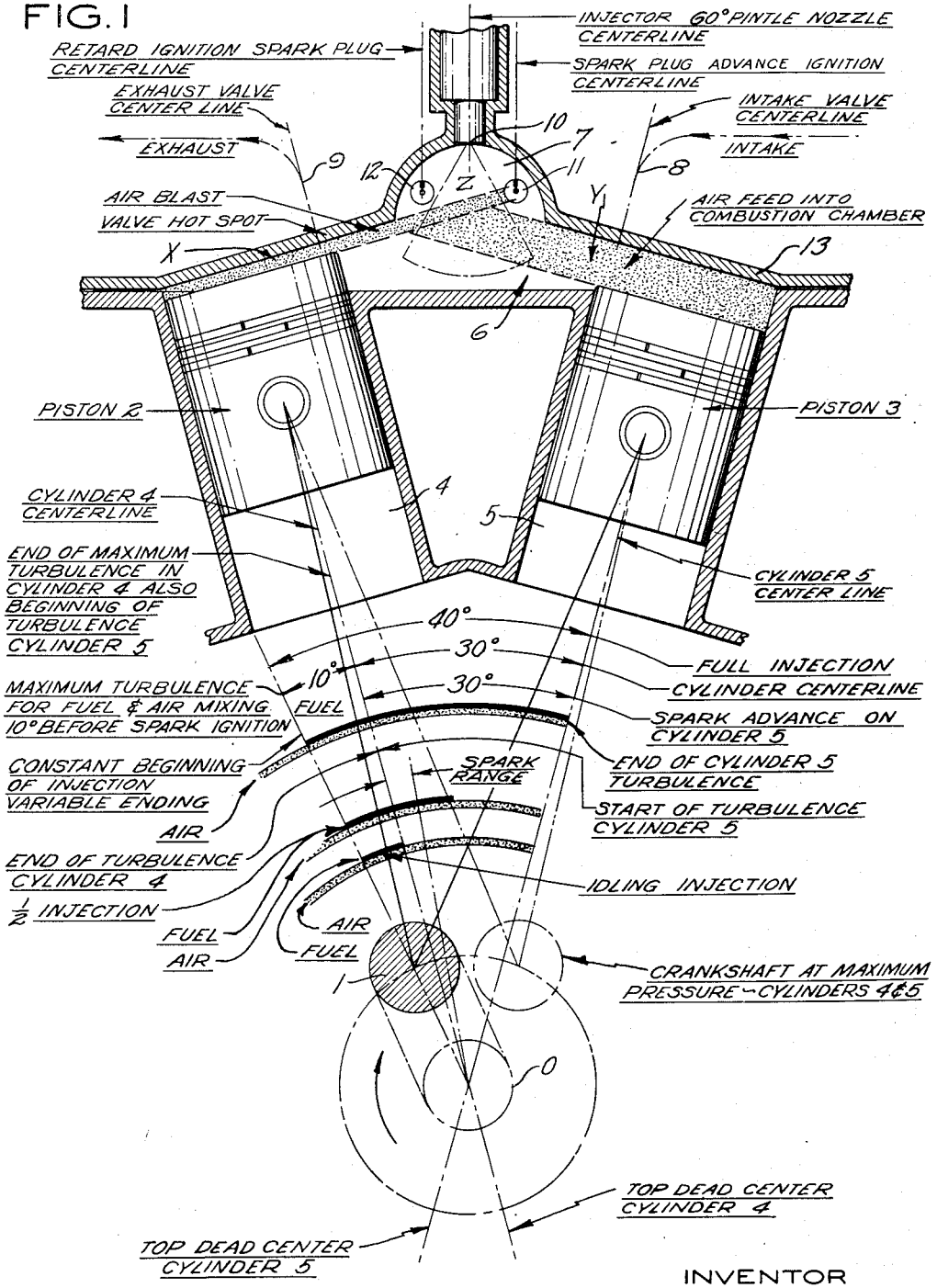

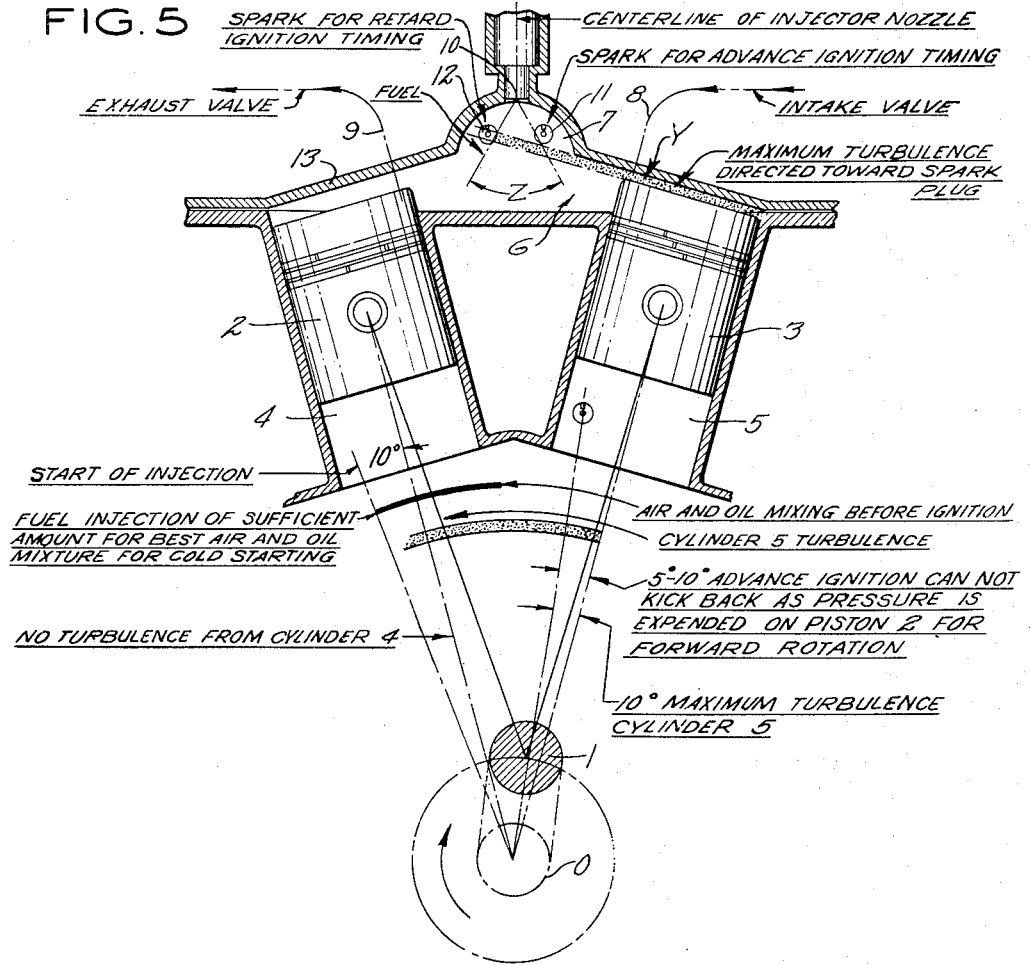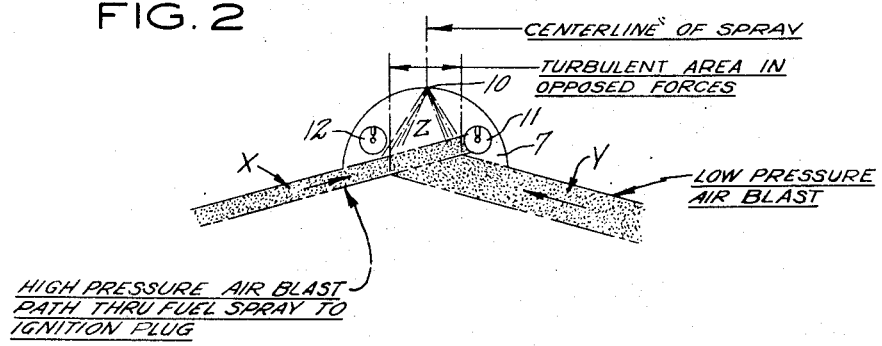

2,628,603

UNITED STATES PATENT OFFICE 2,628,603

INTERNAL-COMBUSTION ENGINE

Julius M. Ulrich, Old Greenwich, Conn.

Application April 14, 1950, Serial No. 156,031

4 Claims. (Cl. 123—53)

This invention relates to internal combustion engines using fuel oil as a fuel, the object in view being to produce an engine of the two or four stroke cycle in which the cylinders are arranged at a V angle corresponding to the maximum spark advance of the engine, and having a combined combustion chamber of novel design in which the charge is exploded by a dual electric ignition system, the expanding charge acting simultaneously on both pistons, and the latter being connected with the crank-shaft so that one of the pistons will always operate in advance of the other, thereby producing at firing time a maximum air blast into the combustion chamber, and a second air blast into the combustion chamber at the end of the combustion cycle. The first air blast is created by the leading piston, while the second air blast is created by the follow-up piston and takes place at the end of the combustion cycle. In other words, an engine in which the combustion chamber is fed with two distinct and timed air blasts or turbulence cycles, one at the beginning of fuel injection for mixing the air with the injected fuel and so proportioned or timed as to give a mixture suitable for cold starting at reasonable temperatures. The other air blast completes combustion by feeding air into the burning mass together with a second turbulence pattern for final combustion of the fuel.

A further object of my invention is to produce a combustion expansion cycle wherein the maximum expansion pressures are reached when the leading piston has travelled past its top dead center by an approximately 30° crank angle and the following piston is at its top dead center. This arrangement lends itself to a quieter engine. Any peak pressures are absorbed by leading piston which at this time is on its downward travel and is moving away from any peak pressures, so that this engine will have no-knock characteristics and the power output at crank shaft will be far greater than in an engine with piston pin, crank pin and crank journals in line. In other words, any rise in combustion pressures will be instantly absorbed by the leading piston for useful work.

Another object of the invention is to produce a novel pilot gas arrangement for mixing air and fuel to form a gaseous mixture that can be readily fired by electric spark ignition. This object is accomplished by my novel time-cycle for fuel injection and turbulence pattern sequences as well as by a novel construction wherein said pilot gas is injected towards the combustion chamber in such manner as to permit optimum air turbulence in relation to the spark plug.

The invention further consists of novel construction, combinations and arrangements of parts as herein described, illustrated and claimed.

Fig. 1 is a section through the engine combined with a schematic fuel injection timing diagram;

Fig. 2 is a view of the turbulent areas;

Fig. 3 is a top view of the offset cylinders and combustion chamber, fuel injector and spark-plug positioning;

Fig. 4 is a timing diagram showing injection timing with maximum turbulence in leading cylinder running with full spark advance; and Fig. 5 is a timing diagram for hand starting with retarded spark advance.

Referring to the drawings in detail, Figs. 1, 4 and 5 show schematic sections of a V-type engine where there is attached to crankshaft O a crank pin 1 to which are connected pistons 2 and 3 by means of connecting rods (not shown). Both connecting rods are mounted side by side on crank pin 1 common to both and cause said pin to rotate in a clockwise direction. Leading piston 2 reciprocates in cylinder 4 while following piston 3 reciprocates in cylinder 5. Said cylinders 4 and 5 may be offset about 30° from each other, for example, and communicate with each other through common combustion chamber 6 and spray chamber 7. Air is introduced into chamber 6 through inlet valve 8, only the center line of which is illustrated while exhaust gases are emitted through exhaust valve 9, only the center line of which is illustrated.

The fuel injection nozzle 10, which may consist of the wide angle Pintel type of low pressure delivery, is located at the top center of spray chamber 7 and produces a spray envelope Z therein.

Ignition spark plugs 11 and 12, of which only the spark gaps are illustrated, located within the bulbous or recessed spray chamber 7, are positioned substantially in line with the maximum air blast columns from cylinders 4 and 5 respectively. The fuel injection nozzle 10 is raised out of the path of the respective maximum air blasts so that the sprayed fuel oil is more fully reduced to fine droplets before being mixed with the air blast directed through it. Spray chamber 7 may be spherical, conical, or any practicable shape as desired.

The cylinder head 13 is shaped so as to provide maximum air blast projection from each cylinder to a corresponding spark plug gap directly in line with it. That part of the cylinder head which is directly above each piston may be arranged to be parallel with the top of the piston to produce such a desirable air blast. It will be noted from the drawings that the internal plane surfaces of those portions of the cylinder head that are above the cylinders are in substantially a direct line with a corresponding spark gap within the recessed fuel spray chamber. Also the top plane surface of each piston and the corresponding opposing inner surface of the cylinder head may be substantially perpendicular to the longitudinal dimension of the respective cylinders. Cylinder head 13 is not only common to the top of both cylinders 4 and 5, but also forms the enclosure for combustion chamber 6 and spray chamber 7.

The volume of turbulent air displaced by pistons 2 and 3 when approaching their respective top dead centers is acted upon by the full area of the top of the pistons. Substantially all of the displaced air is projected directly into the combustion chamber through spray envelope Z to a corresponding spark plug gap. The fact that the cylinder head above the cylinder is substantially parallel to the top of the piston results in maximum air blast turbulence efficiency.

The two cylinder V-engine being described may be placed in tandem with similar two-cylinder sets and connected to a common crankshaft in the well-known manner.

When pistons 2 and 3 are positioned as in Fig. 1, maximum compression has been reached. This same pressure will be retained until piston 3 reaches its top dead center. That is, as piston 2 recedes, piston 3 advances to its top dead center so that a balance of pressure is maintained for a period of 30° or whatever the cylinder offset in degrees may be.

In Fig. 1 a fuel injection timing diagram is also illustrated. All timing degrees are taken from the center line (₵) of cylinder 5. The fuel injection system shown therein gives a constant beginning and variable ending of injection. Full injection is of 40° duration so that injection of fuel through nozzel 10 begins 10° before top dead center of piston 2 is reached when maximum air blast is had at X. For this timing the engine is running with full spark advance. This air blast mixes with the injected fuel as it passes through the spray envelope Z shown as a dotted sector in chamber 7, and is ignited by spark plug gap 11. The spray envelope Z may be projected at a 60° angle from nozzle 10. Burning of the injected fuel continues to the end of injection. Toward end of injection piston 3 reaches its top dead center and another maximum air blast feeds air to the burning mixture to complete combustion, and maximum expansion has been reached. Both pistons are now on the downward or power stroke. (All of the above is for full injection of 40°. See Fig. 4.)

If the injection period is shortened to say one half or idling, there is still provided the 10° mixing period of air and fuel through air blast at X before piston 2 reaches its top dead center. In other words, this time element together with maximum turbulence does not change and is the same for any duration of injection. To complete the combustion of the fuel, piston 3 feeds air under maximum turbulence into the combustion chamber and maximum turbulence is reached as said piston approaches its top dead center. This holds true with engine running at maximum spark advance of say 25° to 30°, for example, should the ignition of the spark plugs be set for up to about 5° to 10° after leading piston 2 reaches its top dead center.

Now if engine is started by hand cranking a retarded spark timing must be used, as illustrated schematically in Fig. 5.

This changes the picture somewhat in that piston 3 has reached its top dead center and air blast at Y becomes maximum, air blast at X having ceased 30° before. This air blast from cylinder 5 at Y carries through fuel envelope Z to spark plug gap 12, between one half to full injection being used for starting. Under the conditions of this time cycle arrangement, it is possible to start from cold engine with fuel oil, while no other fuels or heating devices are necessary in summer temperatuers. It is understood that a high voltage spark is used to advantage in this connection. In winter temperatures, if necessary, a shot of gasoline sprayed into the inlet air stream could be used to assist starting, since a low pressure engine as defined by this invention could burn gasoline.

In this system at full spark advance the critical time of mixing the fuel oil with maximum air blast is at the start of injection, and not at the end of injection as in present day engines.

Also the compression pressures will be kept constant; that is not throttling of the air charge is required.

Fig. 2 illustrates the opposed forces of the air blasts created by pistons 2 and 3. When piston 2 reaches its top position maximum air blast or turbulence has been reached. This is the high pressure zone. As piston 3 is some distance away from its top dead center the air blast being created is of a lower pressure so that the high pressure blast from piston 2 passes through the fuel spray Z while at the same time it carries some of the low pressure air with it to reach spark gap 11. These conditions are prescribed for engine running at full spark advance.

Fig. 3 illustrates the offset cylinder location and the substantially semi-spherical part of the combustion chamber or more specifically the spray chamber. Spark gaps 11 and 12 are positioned in an offset relation to the center line of the spray nozzle. Spark gaps 11 and 12 are also positioned so that air blasting through the conical fuel spray envelope Z will pick up the lighter and more volatile ends of the spray envelope, so that the most ignitable characteristics of the fuel are fully used for easy starting from cold.

It is understood that spark gaps 11 and 12 usually ignite simultaneously and that ignition timing is set when either piston 2 or piston 3 is at or substantially near its respective top dead center, depending upon whether advance or retard spark timing is determined upon or required. In some instances it is possible to operate the engine with only one spark gap since sufficient turbulence and admixture of fuel and air are created by the configuration of the top of the pistons, the portions of the cylinder head over the cylinders and the recessed fuel injection chamber as shown in Figs. 1, 4 and 5.

Figs. 4 and 5 more fully illustrate the turbulence phenomena described in relation to Fig. 3, and more fully show the turbulence pattern in relation to the ignition timing. In Fig. 4 the maximum ignition advance is shown as 30° by way of example. With engine running at this ignition setting the turbulence created in cylinder 4 is used to mix the air and injected fuel and to direct the mixture to spark gap 11 for firing. The start of injection is shown with a 10° advance over the ignition setting. This remains constant regardless of the injection duration.

That is, it remains the same 10° regardless of the amount of fuel being injected whether idling, one half or full fuel injection is used. This 10° period is used for mixing the first of the fuel injected together with the air blast which is maximum during this time.

Fig. 5 illustrates diagrammatically the turbulence switch-over from cylinder 4 to cylinder 5 when hand starting and retard spark must be used. When the engine is being hand started, first the injection pump rack is set at about one-half to nearly full injection. The spark is retarded to 10° advance. The first part of the injected fuel will be mixed with air from turbulence created by piston 2 at its top dead center. This turbulence then ceases. The fuel still being injected is now mixed with the turbulent air created by piston 3 as it approaches its top dead center and the mixture is directed to spark gap 12 for firing. Spark gap 12 will be in the rich fuel zone and spark gap 11 will be in the lean zone. As the ignition system will have double spark ignition, both spark gaps firing substantially simultaneously, either one of the gaps that receive the best mixture will explode the charge. Since piston 2 is from 20° to 25° past its top dead center, the engine cannot kick back as the pressure of combustion is expanded on aforesaid piston for forward rotation. The fuel pump rack setting can readily be determined to provide the amount of injection for best starting mixture. When hand starting is prescribed, the foregoing example of '10° spark retard relates to 10 crankshaft rotational degrees before following piston 3 reaches top dead center.

A significant feature of the present invention is that the unusual efficiency of my novel engine is made possible by pilot-gas ignition. The use of the phrase "pilot gas" is meant to convey the thought of mixing air and oil to form a gaseous mixture that can readily be fired through the use of spark ignition. This pilot gas is used for the initial ignition of the whole fuel charge.

In Fig. 1 injection of fuel is shown to start 10° before ignition. This 10° angle is used to mix the highly heated and turbulent air with a small amount of injected fuel to furnish, as it were, a starting or pilot gas for the initial ignition of the fuel.

This gaseous fuel is readily fired by the heat of the spark and all fuels injected later for the full fuel injection period of 40° will be ignited from the combustion of the pilot gas.

Only a small part (10° crank angle) of the injected fuel is gasified so that crank-case dilution is held at a minimum, and a knock-free engine is thus assured.

The time element or angle of degrees of mixing the air and injected fuel can be changed somewhat by retarding the spark setting by 5° to obtain a longer period of air and oil mixing of 15° crank angle. The time element required to mix the air with the fuel for the formation of a so-called pilot gas may be further lengthened by advancing the start of injection five or more crank angle degrees for the suitable duration for cold starting. In this way the cylinder offset angle of 30° is not altered. It is assumed that the air blast from piston 2 does not cease immediately piston reaches its top dead center, but will carry over at least 5 or more degrees before its force is spent.

At throttling periods and idling injection of the fuel only the pilot gas is burned. That is, at idling only a gaseous mixture is burned which will help greatly in the smooth idling cycle of the engine.

In the foregoing description the respective center lines of the cylinders have been indicated as being positioned at a 30° angle from each other and the preferred ignition spark advance has been prescribed as corresponding approximately to said angle. These conditions bring about the best maximum air blast before ignition. In practice, however, it is also possible that while the cylinder angle of 30° can be maintained, the spark timing can be retarded for up to about 5° to 10° after top dead center of piston 2 and still get the benefits of maximum air blast from leading piston 2 for best mixing of fuel and air for pilot ignition. The cylinder angle may vary, also, but whatever that angle is, the optimum spark advance setting should correspondingly be approximately the same angle.

The design of the engine and the specific methods of fuel injection with the corresponding spark settings make possible cold starting with any of the light fuel oils, particularly since the fuel mixture is under high turbulence and is projected directly toward the spark gap. The distance that the mixed fuel and air has to travel toward the spark gap is quite short since the spark gap is very near the fuel spray envelope.

The present invention provides a knock-free engine which operates with minimum revolutions at throttling. Also great economy is insured since only one-half the number of pumps and injectors per engine cylinder is required. The novel arrangement of the cylinder head, fuel injection and spark gaps results in fuel economy by virtue of the two stage directed turbulence which provides for more complete fuel combustion than is achieved by other types of engines where cylinder head design has resulted in a large degree of lost turbulence.

My present invention provides a low pressure engine which permits lightweight and hence economical construction without critical parts or materials while low pressure injection equipment in the range of 500 pounds results in long engine life.

I find that low pressure fuel injection lends itself to distributor type fuel injection resulting in economies in equipment costs. Also no governor is required to meter the fuel, except for stationary engine work, while engine air intake need not be throttled since there is no linkage to the fuel injection system. The engine incorporating the various novel features of the present invention is found to produce a comparatively quiet open exhaust particularly because of the novel combustion process that is prescribed.

It is understood throughout the description that the timing cycles relating to fuel injection and spark setting are defined in angular degrees corresponding to the angular rotation of the crankshaft.

I claim:

1. An internal combustion engine comprising two cylinders forming a V-angle, a piston contained in each of said cylinders, said pistons being attached by connecting rods to a common crank-pin of a crank shaft, a cylinder head over said cylinders, said cylinder head forming a combustion chamber common to both cylinders, a fuel injection chamber positioned in said cylinder head midway between said cylinders and raised above the combustion chamber, a fuel injection nozzle in the top center of said fuel injection chamber, two spark gaps in said fuel injection chamber, each of said spark gaps being positioned offset from said nozzle in a direction substantially opposite to a corresponding portion of the cylinder head directly above a cylinder whereby an air blast from said cylinder is projected by said portion directly toward said spark gap through the fuel spray envelope projected by said nozzle into said fuel injection chamber.

2. An internal combustion engine comprising two cylinders forming a V-angle, a piston contained in each of said cylinders, said pistons being attached by connecting rods to a common crank-pin of a crank shaft, a cylinder head over said cylinders, said cylinder head forming a combustion chamber common to both cylinders, a fuel injection chamber positioned in said cylinder head mid-way between said cylinders and raised above and communicating with said combustion chamber, a fuel injection nozzle in the top of said fuel injection chamber, at least one spark gap in said fuel injection chamber, said gap being positioned offset from said nozzle in a direction substantially opposite to a corresponding portion of the cylinder head directly above a cylinder whereby an air blast from said cylinder is projected by said portion directly toward said spark gap through the fuel spray envelope projected by said nozzle into said fuel injection chamber.

3. An internal combustion engine comprising two cylinders forming a V-angle, a piston in each of said cylinders, a crank shaft, said pistons being connected to a common crank pin on said crank shaft, a cylinder head over said cylinders, said cylinder head forming a combustion chamber common to both cylinders, the portions of said cylinder head above each cylinder being substantially perpendicular to the longitudinal dimension of said respective cylinders, a fuel injection chamber in said cylinder head substantially mid-way between said cylinders, said fuel injection chamber being recessed above said combustion chamber, a fuel injection nozzle in the top of said fuel injection chamber, at least one spark gap in said fuel injection chamber, said gap being positioned offset from said nozzle in a direction substantially opposite to a corresponding perpendicular portion of the cylinder head directly above a cylinder whereby an air air blast from said cylinder is projected by said portion directly toward said spark gap through the fuel spray envelope projected by said nozzle into said fuel injection chamber.

4. An internal combustion engine comprising two cylinders forming a V-angle, a piston in each of said cylinders, a crank shaft, said pistons being connected to said crank shaft, a cylinder head over said cylinders, said cylinder head forming a combustion chamber common to both cylinders, at least a portion of said cylinder head above each cylinder being substantially perpendicular to the longitudinal dimension of said cylinders, each of said portions being substantially parallel to the tops of a respective piston, a fuel injection chamber in said cylinder head between said cylinders, said fuel chamber being recessed above said combustion chamber, said fuel chamber having a substantially semispherical shape, a fuel injection nozzle in the top of said fuel injection chamber, said nozzle being arranged to inject a fuel spray envelope into said fuel chamber, two spark gaps in said fuel injection chamber, each of said spark gaps being positioned offset from said nozzle in a direction substantially opposite to a corresponding perpendicular portion of the cylinder head directly above a cylinder whereby an air blast from said cylinder is projected by said portion directly toward said spark gap through the fuel spray envelope projected by said nozzle into said fuel injection chamber.

JULIUS M. ULRICH.

REFERENCES CITED

The following references are of record in the file of this patent:

UNITED STATES PATENTS

| Number | Name | Date |
| --- | --- | --- |
| 1,687,673 | Lang | Oct. 16, 1928 |
| 2,142,280 | Mock | Jan. 3, 1939 |
| 2,371,787 | Ward | Mar. 20, 1945 |
| 2,484,009 | Barber | Oct. 11, 1949 |

FOREIGN PATENTS

| Number | Country | Date |
| --- | --- | --- |
| 6,581 | Great Britain | Mar. 16, 1910 |
| 38,370 | France | May 30, 1931 |
| | (Addition to No. 647,019) | |
| 553,334 | France | May 22, 1923 |
| 627,780 | France | June 14, 1927 |
| 675,474 | France | Nov. 7, 1929 |
| 704,735 | Germany | Apr. 15, 1941 |